United States Patent [19]
Henderson et al.

[11] Patent Number: 5,514,754
[45] Date of Patent: May 7, 1996

[54] METHOD OF INCREASING THE SIZE AND ABSORPTION UNDER LOAD OF SUPERABSORBENT FINE PARTICLES BY IMPREGNATION WITH AN AQUEOUS ACRYLIC MONOMER SOLUTION

[75] Inventors: John A. Henderson, Birkenhead, United Kingdom; Anthony S. Tomlin, Island Lake, Ill.; David M. Lucas, West Kirby, United Kingdom

[73] Assignee: American Colloid Company, Arlington Heights, Ill.

[21] Appl. No.: 314,364

[22] Filed: Sep. 28, 1994

[30] Foreign Application Priority Data

Jul. 6, 1994 [GB] United Kingdom .................. 9413605

[51] Int. Cl.$^6$ .................................. C08F 265/02
[52] U.S. Cl. ........................ 525/296; 525/274; 525/301; 525/286; 525/312
[58] Field of Search .................... 525/296, 301, 525/286, 304, 274, 312

[56] References Cited

U.S. PATENT DOCUMENTS 5,180,798  1/1993  Nakamura .................... 526/66
5,373,066 12/1994  Rebre ........................ 525/387
5,422,405  6/1995  Dairoku et al. ............. 525/384

*Primary Examiner*—Vasu S. Jagannathan
*Attorney, Agent, or Firm*—Marshall, O'Toole, Gerstein, Murray & Borun

[57] ABSTRACT

A method of enhancing the water absorbance of and increasing the particle size of fine water absorbent cross-linked polyacrylic polymer particles includes impregnating the polymer particles with an impregnating monomer solution containing an acrylic monomer, with or without a cross-linking agent for the acrylic monomer. The solution is impregnated into the resin in a weight ratio of cross-linked polyacrylic polymer, dry basis, to impregnating monomer solution in the range of about 1:1 to about 1:10; and subjecting the impregnated polymer to conditions, such as increased temperature, e.g., 100° C.–150° C. to polymerize the impregnated monomer, within the cross-linked polymer particles, to form a cross-linked polyacrylic polymer having enhanced water absorbance and increased particle size.

29 Claims, No Drawings

METHOD OF INCREASING THE SIZE AND ABSORPTION UNDER LOAD OF SUPERABSORBENT FINE PARTICLES BY IMPREGNATION WITH AN AQUEOUS ACRYLIC MONOMER SOLUTION

FIELD OF THE INVENTION

The present invention relates to a method of increasing the size and absorption under load of fine particles of water-insoluble, cross-linked polyacrylic superabsorbent polymers (SAP) by impregnating and intimately mixing the fine particles with an aqueous solution of an acrylic monomer, either acrylic acid, or partially or fully neutralized acrylic acid to form a paste. The paste then is subjected to conditions sufficient to promote polymerization of the impregnated monomer(s), such as extrusion and elevated temperature. When dried to a moisture content of about 15% by weight, or less, the particles then may be milled or pulverized to a desired particle size range, including particles greater in size than the original fine material (dry agglomeration). The so-formed agglomerates surprisingly remain as single particles upon hydration with saline solution (wet agglomeration) and display improved absorption under an applied load (AUL).

BACKGROUND OF THE INVENTION AND PRIOR ART

Water-absorbing resins have found wide use in sanitary goods, hygenic goods, wiping cloths, water retaining agents, dehydrating agents, sludge coagulants, disposable towels and bath mats, disposable door mats, thickening agents, disposable litter mats for pets, condensation preventing agents and release control agents for various chemicals. Water-absorbing resins are available in a variety of chemical forms including substituted and unsubstituted natural and synthetic polymers, such as hydrolysis products of starch acrylonitrile graft polymers, carboxymethylcellulose, cross-linked polyacrylates, sulfonated polystyrenes, hydrolyzed polyacrylamides, polyvinyl alcohols, polyethylene oxides, polyvinylpyrrolidines and polyacrylonitriles.

In some polymerization processes for manufacturing water-absorbent polymers, such as cross-linked polyacrylic super-absorbent polymers, one or more monomers are polymerized in water to produce a polymer that then must be ground to provide a desired particle size, with or without an intermediate drying step, for incorporation into a variety of different products, as outlined above. During the grinding process, fine particles result that are undesirable due to dusting, or other manufacturing problems. Fine superabsorbent material is considered to be undesirable in many personal care applications including infant diapers and adult incontinence devices. Such fine material can migrate in the device before use and exhibit gel blocking in application.

European Patent EP 0 463 388 A1 (Hoescht Celanese) discloses a process for recycling sub 75 μm SAP fines back into a reaction gel at 16%–17% solids. However, only 4% recycle is possible and the addition of extra process water is required. International classification CO8L33/02 (Seitetsu) describes a method whereby fine powder may be blended with a prepared polyacrylate solution into a crumbly mix which generates agglomerates on drying at up to 150° C. International publication number WO 90/08789 (Dow) describes an agglomeration route involving the use of hydrocarbon solvents to suspend fine particles which are then clustered by the addition of acrylate monomer solution under polymerization conditions in the presence of an amorphous silica powder. Seitetsu also disclose the use of organic solvents as a dispersion phase in U.S. Pat. No. 4,732,968 (EP 0 224 923). SAP fines are dispersed in an inert solvent with addition of silica in the presence of water and a suitable surfactant, followed by removal of solvent and drying.

All the above disclosures share disadvantages of either relatively low rates of fines consumption, or the use of large amounts of organic solvents and expensive silica additives. In addition there is no claim of enhanced superabsorbent performance other than lack of gel blocking in the agglomerated material.

WO 90/08789 describes a process for agglomeration of superabsorbent fines involving the use of hydrocarbon on solvents to suspend fine particles which are then clustered by the addition of acrylate monomer solution under polymerization conditions in the presence of an amorphous silica powder.

The present invention has the advantages of allowing high rates of rework of undersized product and does not require the use of solvents or silica additives. In the present invention, a process is disclosed wherein fine SAP particles are impregnated with an aqueous monomer solution of acrylic acid and/or partially or fully neutralized acrylic acid, or mixtures, during high shear mixing in order to generate a continuous high viscosity (e.g., about 20,000 to about 5,000,000 centipoises) paste. In the preferred embodiment, the paste is subjected to conditions which simultaneously promote drying of the product and polymerization of the impregnated monomer(s). Upon subsequent milling of the dry product, particles of increased particle size are obtained. These particles retain particle integrity upon hydration and demonstrate enhanced polymer performance in the absorption under load test.

SUMMARY OF THE INVENTION

In brief, the present invention is directed to a process for increasing the size of fine particles of SAP (cross-linked polyacrylic acid, cross-linked polyacrylate, and/or cross-linked partially neutralized polyacrylic acid) and, more particularly, to a process of impregnating the SAP particles with an aqueous monomer solution of acrylic acid and/or metal salts of acrylic acid. Impregnation is achieved by intimately mixing the SAP fines (e.g., having a particle size less than about 300 μm) with the monomer solution to form a paste having a viscosity of, e.g., about 20,000 to about 5,000,000 centipoise. Polymerization of a monomer within, and drying of, the paste then is achieved, e.g., by heat. The dry (0 to less than about 15% by weight water) product then is milled to a suitable particle size distribution, to yield a product of improved particle size distribution (hereinafter defined as dry agglomeration), which retains its agglomerated nature upon hydration (hereinafter defined as wet agglomeration) and displays improved absorption under load (AUL) when compared to the original fine particles.

According to the present invention, the fine particles of SAP are impregnated with an aqueous monomer solution containing acrylic acid, partially neutralized acrylic acid, fully neutralized acrylic acid (acrylate) or mixtures thereof. The monomer solution should have at least about 40% by weight water, and preferably about 60% to about 80% by weight water, based on the weight of water and polymerizable monomers. The solution is impregnated into the particles at a weight ratio of cross-linked SAP polymer to monomer solution in the range of about 1:1 to about 1:10, preferably about 1:1 to about 1:5, and more preferably about 1:1 to about 1:3, in a suitable high shear mixer to form a continuous, homogeneous dough or paste. The mixture of fines and monomer solution should have the consistency of a relatively stiff dough, and the mixing is sufficiently thorough that the particle memory of the original fines are lost in the final product, and the monomer solution becomes thoroughly absorbed by and impregnated into the fine particles. Suitable mixers include Z-blade or Sigma blade mixers, planetary mixers, or other mixers designed to process high viscosity mixes.

The absorption of monomer solution softens and impregnates the interior of the cross-linked SAP particles such that the monomer(s) thereafter can be polymerized from the interior, as well as the exterior, of the fine SAP particles.

The fine particles and monomer combine to form a dough in which the monomer(s) is polymerized after intimate mixing and impregnation into the interior of the fine, cross-linked polyacrylic polymer particles. The fine particles are thereby enlarged via the formation of additional polymer (polymerized from the impregnated monomer(s)) physically and/or chemically bound from within the fine particles and extending outwardly from the outer surface of the fine particles, to join with other particles. The newly formed polymer, deeply seated within the fine impregnated polymer particles also can graft polymerize with adjacent fines impregnated with polymerizing monomer to form strong, coherent agglomerates, such that the agglomerated fines do not separate upon hydration.

The dough or paste preferably is divided into smaller parts for efficient drying and polymerization of impregnated monomer(s), e.g., plucked apart into chunks, or extruded into strands. The formed paste is conveniently rendered suitable for drying and more efficient monomer polymerization by extruding the paste into strands, which are then dried and polymerization of the monomer(s) activated, such as by subjecting the strands of impregnated fines to sufficient temperature, in the range of about 50° C. to about 150° C., preferably about 120° C. to about 150° C., until the polymer is sufficiently dry and brittle to mill or otherwise pulverize into a desired particle size distribution.

In accordance with one embodiment of the present invention, partially or fully neutralized acrylic acid is polymerized from a monomer solution after intimately mixing and impregnating the monomer solution into solid particles of a cross-linked polyacrylic polymer selected from polyacrylic acid, partially neutralized polyacrylic acid, fully neutralized polyacrylic acid, and mixtures thereof. The monomer solution contains an acrylic monomer selected from acrylic acid, partially neutralized acrylic acid, fully neutralized acrylic acid, and mixtures thereof, with or without a cross-linking agent for the monomer(s). To achieve the full advantage of the present invention, the monomer solution contains (prior to admixture with the cross-linked polyacrylic polymer SAP fines) at least about 20% water, preferably at least about 30% by weight water, more preferably about 40% to about 80% water. The method includes the step of impregnating the solid, polymerized, cross-linked polyacrylic polymer fines with an aqueous solution containing at least one acrylic monomer, with or without a cross-linking agent for the acrylic monomer. The impregnated monomer then is polymerized.

To achieve the full advantage of the present invention, the mixture of the impregnating monomer solution and polymer fines should have a consistency of a dough or paste capable of retaining a hand molded shape or retaining a strand structure upon extrusion. The dough or paste should not be too soft to prevent efficient processing, nor so stiff as to damage the product through excessive shearing during mixing.

The dough or paste mix then is subjected to conditions necessary to polymerize the monomer(s), with or without a cross-linking agent, impregnated in the dough or paste while in the interior of the SAP fines. The newly formed polymer is formed by polymerization of impregnated monomer within the interpenetrating network of softened, expanded SAP fines. The newly formed polymer extends from within the fines and outwardly from adjacent fines, with graft polymerization onto other, adjacent polymer chains, to form a new interpenetrating polymer network which, on pulverizing, yields strong, coherent agglomerates (increase in particle size distribution—dry agglomeration) that do not separate into smaller particles upon hydration (wet agglomeration). Additionally, the product particles display improved absorption under load compared with the parent fine particles.

Accordingly, one aspect of the present invention is to provide a process for increasing the size of smaller particles of a cross-linked polyacrylic polymer by the aqueous polymerization of an acrylic monomer selected from the group consisting of acrylic acid, partially neutralized acrylic acid, fully neutralized acrylic acid, and mixtures thereof, by impregnating fine particles of a cross-linked, water-insoluble polyacrylic polymer with an aqueous solution containing one or more acrylic monomer, with or without a cross-linking agent for the acrylic monomer(s). The weight ratio of solid, cross-linked polyacrylic polymer particles to impregnating monomer solution should be in the range of about 1:1 to about 1:10, preferably about 1:1 to about 1:5, more preferably about 1:1 to about 1:3 to achieve a dough or paste that can be mixed easily without damage due to excessive shearing during mixing.

Another aspect of the present invention is to provide a process for increasing the size of particles of cross-linked, water-absorbent polyacrylic polymers by polymerization of an acrylic monomer solution intimately mixed with and impregnated (absorbed) within the fine particles of a cross-linked polyacrylic polymer. Preferably, the monomer solution contains at least about 20% by weight water, more preferably at least about 40% water, based on the total weight of the impregnating monomer solution.

Another aspect of the present invention is to provide water-absorbent, cross-linked polyacrylic polymer particles having increased absorption under load (AUL) wherein absorbed fluids, e.g., water saline or urine, are more difficult to squeeze out of the cross-linked polyacrylic polymer particles.

Another aspect of the present invention is to provide a process for producing cross-linked polyacrylic polymer particles of increased size, by impregnating solid, cross-linked polyacrylic polymer particles with a solution containing an acrylic monomer, to form impregnated cross-linked polyacrylic polymer particles having a dough or paste consistency, and then subjecting the impregnated polyacrylic polymer paste to conditions sufficient to polymerize the monomer, thereby increasing the size of the polyacrylic polymer particles achieved by pulverizing.

Fine particles of a water-absorbing, cross-linked polyacrylic polymer are increased in size and water-absorbing capability by impregnating relatively fine particles of the cross-linked polyacrylic polymer with a solution containing one or more acrylic monomer(s), and then polymerizing the monomer(s) while impregnated into the solid cross-linked polyacrylic polymer particles.

The above and other aspects and advantages of the present invention will become apparent from the following detailed description of the preferred embodiment.

DETAILED DESCRIPTION OF THE PREFERRED EMBODIMENTS

In accordance with the present invention, improved cross-linked, water-absorbent polyacrylic polymer particles, having increased size, the ability to retain particle integrity upon hydration, and improved absorption under load (AUL) are prepared by impregnating solid particles of a cross-linked, water-absorbent polyacrylic polymer selected from polyacrylic acid, partially neutralized polyacrylic acid, fully neutralized polyacrylic acid, and mixtures thereof, with a monomer solution containing one or more acrylic monomers selected from acrylic acid, partially neutralized acrylic acid, fully neutralized acrylic acid, and mixtures thereof, with or without a cross-linking agent for the monomer(s). The monomer solution preferably contains at least about 40% by weight water, preferably about 60% to about 80% by weight water, the remaining percentage comprising a polymerizable acrylic monomer, with or without a cross-linking agent for the acrylic monomer. After impregnating the solid polymer particles and, preferably, after thoroughly and homogeneously mixing the solution with the solid polymer particles to a homogeneous consistency of a dough or paste, the impregnated particles are subjected to conditions sufficient to polymerize the monomer(s), e.g., by heating the particles to a temperature in the range of about 50° C. to about 150° C., preferably at least about 120° C., for a time sufficient that the mass of impregnated polymer particles is sufficiently dry and brittle to mill or pulverize to a desired particle size distribution.

It has been found that acrylic acid monomer, neutralized in the range of about 25 to 100 mole percent, preferably about 60 to about 80 mole percent, will polymerize rapidly, with or without a cross-linking agent, from an aqueous monomer solution containing at least about 40% by weight, preferably about 60% to about 80% by weight water, when the monomer solution is impregnated and thoroughly mixed into particles of a solid, cross-linked polyacrylic polymer. The weight ratio of polyacrylic polymer particles to monomer solution should be in the range of about 1:1 to about 1:10, preferably about 1:1 to about 1:5, and more preferably about 1:1 to about 1:3, to provide impregnated, cross-linked polymer particles having a doughy or pasty consistency.

The polymer particles, prior to impregnation, preferably have a dry particle size less than about 300 μm. The process of this invention will enlarge the particles and improve their water-absorbency properties. It is understood, however, that the process of the present invention is useful to improve the water-absorbency properties of cross-linked polyacrylic, water-absorbent resins regardless of their particle size. Polymerization of monomer that is thoroughly impregnated into the polymer fines increases the size of the cross-linked, water-absorbent polyacrylic polymer particles, without particle size number increase upon hydration, and enhances the water-absorbing properties of the cross-linked polymer particles.

One or more polymerization catalysts, initiators, and/or cross-linking agents can be added to the aqueous monomer solution, prior to impregnation of the solid polymer particles, to aid in monomer polymerization.

The preferred monomer solution used to impregnate the solid, cross-linked polymer particles comprises an aqueous mixture of acrylic acid neutralized 25 to 100 mole percent, preferably about 50 to about 90 mole percent, more preferably about 60 mole percent to about 80 mole percent neutralized.

The monomer solution can be prepared easily, preferably by placing acrylic acid; a strong alkali neutralizing agent for the acid, such as potassium hydroxide, sodium hydroxide, and/or ammonium hydroxide; and, optionally, the cross-linking agent, if any, into water, and the monomer solution then is thoroughly mixed with and impregnated into the resin particles, for example in a Z-blade mixer or Sigma blender.

Any strongly basic alkali metal compound can be used for neutralization of the acrylic acid, such as ammonium hydroxide, potassium hydroxide, sodium hydroxide, lithium hydroxide, cesium hydroxide, ammonium carbonate, potassium carbonate and/or sodium carbonate. In accordance with one important embodiment of the present invention, it is desirable to use the neutralizing agent usually in an amount sufficient to neutralize acrylic acid about 50 mole percent to about 90 mole percent, preferably, about 60 to about 80 mole percent. The neutralizing agent, e.g., hydroxide, should be included in the monomer solution in such an amount as to achieve not less than about 25%, and preferably not more than about 90% neutralization.

It is preferred that the concentration of monomer(s) in the monomer solution is in the range of about 20 to about 80 percent by weight, more preferably about 20 to about 60 percent by weight. Regardless of monomer concentration, the polymerization of monomer(s) impregnated into the polyacrylic polymer particles can be completed by subsequent drying prior to milling or pulverizing to provide a desired particle size distribution.

In accordance with one embodiment of the method of the present invention, one or more polymerization initiators that are known for use in preparing polyacrylates are added to the monomer solution to initiate polymerization. Examples of useful initiators include thermal initiators, such as ammonium persulfate; sodium persulfate azobisisobutyro-nitrile; 4-t-butylazo-4'-cyanovaleric acid; 4,4'-azobis (4-cyanovaleric acid); 2,2'-azobis (2-amidino-propane) dihydrochloride; 2,2'-azobis (2,4-dimethylvaleronitrile); dimethyl 2,2'-azobisisobutyrate; 2,2'-azobis (2,4-dimethylvaleronitrile); (1-phenylethyl) azodiphenylmethane; 2,2'-azobis (2-methyl-butyronitrile); 1,1'-azobis (1-cyclohexanecarbonitrile); 2-(carbamoylazo)isobutyronitrile; 2,2'-azobis (2,4,4trimethylpentane); 2-phenylazo-2,4-dimethyl-4methoxyvaleronitrile; 2,2'-azobis (2-methylpropane); 2,2'-azobis (N,N'-dimethyleneisobutyramidine) dihydrochloride; 4,4'-azobis (4-cyanopentanoic acid); 2,2'-azobis (2-methyl-N-[1,1-bis (hydroxymethyl)-2-hydroxyethyl]propionamide); 2- 2'-azobis (2-methyl -N-[1,1-bis(hydroxymethyl)ethyl] propionamide); 2,2'-azobis[2-methyl-N-(2-hydroxyethyl)propionamide]; 2,2'-azobis (isobutyramide) dihydrate, and the like.

Any cross-linking agent capable of cross-linking the acrylic polymer resulting from polymerization of the monomer included in the monomer solution is useful in accordance with the principles of the present invention. When used, the cross-linking agent conveniently is mixed with the monomer solution for particle impregnation. The preferred cross-linking agents are water-soluble. Examples of such water-soluble cross-linking agents for acrylic and acrylate monomer polymerization include polyvinyl monomer cross-linking agents, including bisacrylamides such as N,N-methylenebisacrylamide and N,N-methylenebismethacrylamide. Especially preferably is N,N-methylenebisacrylamide.

The cross-linking agent is dissolved in the monomer solution used to impregnate the solid cross-linked polyacrylic particles, in an amount of about 0.001 to about 1 weight percent, preferably 0.005 to 0.1 weight percent, based on the total weight of the monomer solution.

The polymerization proceeds rapidly and controllably by heating the dough of impregnated polyacrylic polymer particles, preferably after mixing one or more polymerization initiator(s) into the monomer solution, and after thoroughly and homogeneously mixing and impregnating the polymer particles with the monomer solution. Polymerization of monomer(s) is completed within a short period of time, usually in about 30 seconds to about 10 minutes.

The polymerization reaction of the monomer(s) from the monomer solution that is impregnated into the cross-linked polyacrylic polymer particles forms additional, new polyacrylic polymer not only extending from an outer surface of the fine SAP particles, but also within the interior of the fine SAP particles to provide larger SAP particles that include newly formed, strongly held polyacrylic polymer. Subsequently, after a drying step, if needed, the solid polymer can be made into a desired particle size distribution, with less fine particles, by the usual method, for example, by milling or pulverizing. Any resulting fines can be treated again in accordance with the method of the present invention so that there are essentially no wasted fine particles.

Dry Agglomeration

Dry agglomeration is defined as a change in particle size distribution of a dry agglomerated powder fraction towards larger particle sizes than the original fines powder fraction. Dry agglomeration was determined by shaking samples over a standard, approximately 300 μm mesh, screen (U.S. Sieve No. 50) and measuring the percentage retention on the screen. Fine SAP particles used to prepare agglomerates were sized to less than 300 μm before use.

Wet Agglomeration

Wet agglomeration is defined as the ability of an SAP agglomerate to retain its single particle nature upon hydration, i.e., a lack of deagglomeration upon hydration. Wet agglomeration was determined by weighing out 50 agglomerate particles on a watch glass and hydrating them with 20 times their weight in 1% sodium chloride solution (15 saline). The particles were allowed to absorb for one hour and then the number of particles was recounted under a microscope.

Absorption Under Load

Absorption under load (AUL) is a measure of the ability of a superabsorbent to absorb fluid under an applied pressure. The AUL was determined by the following method, as disclosed in European Patent No. 443, 627 and corresponding U.S. Pat. No. 5,149,335, hereby incorporated by reference.

0.160 g +/−0.001 g of SAP is carefully scattered onto a 140 μm water-permeable mesh attached to the base of a hollow plexiglass cylinder with an internal diameter of 25 mm. The sample is covered with a 100 g cover plate and the cylinder assembly weighed. This gives an applied pressure of 20 g/cm$^2$. The screened base of the cylinder is placed in a 100 mm petri dish containing 25 mls of 1% saline, and the polymer is allowed to absorb for 1 hour. By reweighing the cylinder assembly, the AUL may be calculated by dividing the weight of liquid absorbed by the dry weight of polymer before liquid contact.

The present invention is described in greater detail with reference to the following examples.

EXAMPLES 1–16

Sodium polyacrylate fines (<300 μm) and monomer solutions were mixed intimately together to form a continuous dough in the chamber of a Z-blade mixer/extruder (Winkworth Model 14Z HMX) by sprinkling the fines gradually onto the stirred monomer solution over about two minutes. Mixing was extended for a further four minutes before the formed viscous paste mix was discharged via an extruder barrel fitted with a mincing dieplate. The resultant extrudate strands were dried at 140° C. until sufficiently brittle to mill to an appropriate particle size distribution (typical drying time around 1.25 hours).

Monomer solutions were based on the following formulation:

|  | Parts By Weight |
|---|---|
| Acrylic Acid | 55 |
| Water | 131.9 |
| 47% Caustic Soda | 48.75 |
| Methylene bis acrylamide (MBA) | 0.108 |

This gives a monomer solution water content of 71% by weight. Modifications to the above formulation were made as indicated in Table 1 by altering the water and cross-linking agent concentrations of the monomer solution.

To 100 parts by weight monomer solution were added the following initiator solutions
 (a) 0.47 parts by weight of 10% by weight aqueous sodium persulphate
 (b) 0.21 parts by weight of 15% by weight aqueous solution of 2,2'-azobis (2-amidinopropane) dihydrochloride (WAKO V50).

Variations on the above NORM levels of initiator and monomer are indicated in Table 1.

The resultant initiator-containing monomer solutions were mixed with the SAP fines in the proportions indicated in Table 1. Agglomeration was assessed by dry particle sizing (850 μm>on-size >300 μm) for dry agglomeration, and by hydrated particle counting for wet agglomeration. The absorption under load of the resultant on-size agglomerates was determined as detailed previously.

TABLE 1

| Example | % Water | Weight Ratio Fines:Liquid | MBA | Sodium Persulphate | 300–850 μm (%) | No. of Hydrated Particles | 0.28 psi AUL |
| --- | --- | --- | --- | --- | --- | --- | --- |
| 1 | 71 | 23:75 | NORM | NORM | 60 | 49 | 20.9 |
| 2 | 71 | 33:66 | NORM | NORM | 49 | 50 | 17.4 |
| 3 | 71 | 40:60 | NORM | NORM | 52 | 49 | 19.8 |
| 4 | 71 | 50:50 | NORM | NORM | 52 | 50 | 18.8 |
| 5 | 71 | 75:25 | NORM | NORM | 23 | 67 | 18.1 |
| 6 | 78 | 25:75 | NORM | NORM | 58 | 50 | 20.4 |
| 7 | 78 | 33:66 | NORM | NORM | 52 | 50 | 20.6 |
| 8 | 78 | 50:50 | NORM | NORM | 56 | 51 | 19.3 |
| 9 | 65 | 30:70 | 0 | NORM | 59 | 48 | 17.3 |
| 10 | 65 | 40:60 | 0 | NORM | 45 | 47 | 16.1 |
| 11 | 65 | 45:55 | 0 | NORM | 46 | 46 | 20.1 |
| 12 | 65 | 40:60 | 0 | 2 x NORM | 48 | 48 | 19.5 |
| 13 | 71 | 30:70 | 0 | NORM | 51 | 48 | 21.5 |
| 14 | 71 | 40:60 | 0 | NORM | 51 | 47 | 21 |
| 15 | 71 | 45:55 | 0 | NORM | 51 | 48 | 21.2 |
| 16 | 71 | 40:60 | 0 | 2 X NORM | 50 | 49 | 21.1 |
| Untreated Fines | — | — | — | — | 0 | — | 8.4 |

In all Examples 1–16, the indicated weight ratio of one of the above monomer solutions was intimately mixed and impregnated into the indicated weight of cross-linked polyacrylate polymer particles to form a dough.

It will be understood that the present disclosure has been made only by way of preferred embodiments and the numerous changes in details of construction, combination, and arrangement of parts can be resorted to without departing from the spirit and scope of the invention as hereunder claimed.

What is claimed and sought to be secured by Letters Patent of the United States is:

1. A method of enhancing the water or aqueous medium absorbance and particle size of solid, water-absorbent, cross-linked polyacrylic polymer particles comprising:

polymerizing and cross-linking an acrylic monomer selected from the group consisting of acrylic acid, neutralized acrylic acid, and mixtures thereof to form said solid cross-linked polyacrylic polymer, that is then dried sufficiently for grinding;

grinding said dried, cross-linked polyacrylic polymer into polyacrylic polymer particles;

separating a portion of the dried, cross-linked polyacrylic polymer particles for impregnation with a solution containing an acrylic monomer;

mixing the separated, dried, cross-linked polyacrylic polymer particles with an impregnating monomer solution containing an acrylic monomer in a concentration of about 20% to about 80% by weight;

wherein the monomer solution is impregnated into the separated, dried, cross-linked polyacrylic polymer particles in a weight ratio of solid polyacrylic polymer particles, dry basis, to impregnating monomer solution in the range of about 1:1 to about 1:10 to form a paste; and polymerizing the impregnated acrylic monomer within the impregnated polyacrylic polymer particles to form coherent agglomerates of said polyacrylic polymer particles having enhanced water absorbance.

2. A method according to claim 1, wherein the weight ratio of separated, polyacrylic polymer particles to impregnating monomer solution is in the range of about 1:1 to about 1:5.

3. A method according to claim 2, wherein the weight ratio of separated, polyacrylic polymer particles to impregnating monomer solution is in the range of about 1:1 to about 1:3.

4. A method according to claim 1, wherein the separated, impregnated polyacrylic polymer particles are heated to a temperature sufficient to polymerize the impregnated monomer.

5. A method according to claim 4, wherein the separated, impregnated polyacrylic polymer particles are heated to a temperature of at least about 50° C. for a time sufficient to form a polyacrylic polymer sufficiently brittle to be pulverized.

6. A method according to claim 5, wherein the separated, impregnated polyacrylic polymer particles are heated to a temperature of about 50° C. to about 150° C.

7. A method according to claim 6, wherein the separated, impregnated polyacrylic polymer particles are heated to a temperature of about 100° C. to about 150° C.

8. A method according to claim 7, wherein the separated, impregnated polyacrylic polymer particles are heated to a temperature of about 120° C. to about 150° C.

9. A method according to claim 7, wherein the separated, impregnated polyacrylic polymer particles are heated to a temperature of about 130° C. to about 150° C.

10. A method according to claim 1, wherein the separated polyacrylic polymer particles have a size less than about 300 μm, prior to impregnation.

11. A method according to claim 1, wherein the separated polyacrylic polymer particles have a size less than about 250 μm, prior to impregnation.

12. A method according to claim 1, further including the step of pulverizing the separated polyacrylic polymer particles to a desired particle size distribution, after polymerization of the impregnated monomer within the polyacrylic polymer particles.

13. A method according to claim 12 wherein:

the separated polyacrylic polymer particles resulting from the pulverizing step have a size below about 300 μm.

14. A method according to claim 1, wherein the impregnating monomer solution further includes a cross-linking agent for the acrylic monomer.

15. A method according to claim 1, wherein the impregnating solution of acrylic monomer is an aqueous solution.

16. A method according to claim 15, wherein the impregnating monomer solution comprises the acrylic monomer dissolved in a carrier consisting essentially of water.

17. A method according to claim 1, wherein the impregnating monomer solution comprises about 20% to about 60% by weight acrylic monomer.

18. A method according to claim 1, wherein the impregnating monomer solution further includes an additional active material selected from the group consisting of a polymerization initiator, a polymerization catalyst, a cross-linking agent, and mixtures, for the acrylic monomer.

19. A method according to claim 18, wherein the additional active material comprises a cross-linking agent selected from the group consisting of methylene bisacrylamide, ethylene glycol diglycidyl ether, a triacrylate, and mixtures thereof.

20. A method according to claim 19, wherein the cross-linking agent is contained in the monomer solution in an amount of about 0.005% to about 1% by weight, based on the total weight of impregnating monomer solution.

21. A method according to claim 1, wherein the impregnated polyacrylic polymer particles are heated to a temperature sufficient to polymerize the impregnated monomer to enlarge the polyacrylic polymer particles.

22. A method according to claim 1, wherein the acrylic monomer impregnated into the polyacrylic polymer particles is selected from the group consisting of acrylic acid, partially neutralized acrylic, fully neutralized acrylic acid, and mixtures thereof.

23. A method according to claim 22, wherein the acrylic monomer impregnated into the polyacrylic polymer particles is a metal salt of acrylic acid, neutralized about 25 to 100 mole percent.

24. A method according to claim 23, wherein the acrylic monomer impregnated into the polyacrylic polymer particles is neutralized about 50 to about 90 mole percent.

25. A method according to claim 24, wherein the acrylic monomer impregnated into the polyacrylic polymer particles is neutralized about 60 to about 80 mole percent.

26. A method according to claim 1, further including the step of pulverizing the separated polyacrylic polymer particles to a desired particle size distribution, after polymerization of the impregnated acrylic monomer.

27. A method according to claim 26, wherein after pulverizing the impregnated cross-linked polyacrylic polymer particles, the particles do not separate into smaller particles upon hydration.

28. A method of increasing the size and water absorbance of water-absorbent solid, cross-linked polyacrylic polymer particles, having a size, prior to treatment, predominantly less than about 300 µm comprising:

polymerizing and cross-linking an acrylic monomer selected from the group consisting of acrylic acid, neutralized acrylic acid, and mixtures thereof to form said solid cross-linked polyacrylic polymer, that is dried sufficiently for grinding;

grinding said dried, cross-linked polyacrylic polymer to form polyacrylic polymer particles, a portion of said particles having a particle size less than 300 µm;

separating a portion of the dried, cross-linked polyacrylic polymer particles having a size less than about 300 µm for impregnation with a solution containing an acrylic monomer;

impregnating said separated, dried, polyacrylic polymer particles with an impregnating monomer solution containing an acrylic monomer in a concentration of about 20% to about 80% by weight;

wherein the monomer solution is impregnated into said separated, dried, cross-linked polyacrylic polymer particles in a weight ratio of solid polyacrylic polymer particles, dry basis, to impregnating monomer solution in the range of about 1:1 to about 1:10 to form a paste; and polymerizing the impregnated acrylic monomer in said paste to form coherent agglomerates of said polyacrylic polymer particles.

29. A method according to claim 28, wherein the separated polyacrylic polymer particles have an initial size less than about 250 µm, prior to impregnation.

* * * * *